United States Patent
Kleihorst et al.

(10) Patent No.: US 9,140,609 B2
(45) Date of Patent: Sep. 22, 2015

(54) INFRARED PRESENCE DETECTOR FOR DETECTING A PRESENCE OF AN OBJECT IN A SURVEILLANCE AREA

(71) Applicant: VLAAMSE INSTELLING VOOR TECHNOLOGISCH ONDERZOEK NV (VITO NV), Mol (BE)

(72) Inventors: Richard Kleihorst, Kasterlee (BE); Marco Camilli, Antwerp (BE)

(73) Assignee: VLAAMSE INSTELLING VOOR TECHNOLOGISCH ONDERZOEK NV (VITO NV), Mol (BE)

( * ) Notice: Subject to any disclaimer, the term of this patent is extended or adjusted under 35 U.S.C. 154(b) by 0 days.

(21) Appl. No.: 14/350,686

(22) PCT Filed: Oct. 26, 2012

(86) PCT No.: PCT/EP2012/071284
§ 371 (c)(1),
(2) Date: Apr. 9, 2014

(87) PCT Pub. No.: WO2013/060859
PCT Pub. Date: May 2, 2013

(65) Prior Publication Data
US 2014/0264035 A1    Sep. 18, 2014

Related U.S. Application Data

(60) Provisional application No. 61/553,457, filed on Oct. 31, 2011.

(30) Foreign Application Priority Data

Oct. 28, 2011    (EP) ..................................... 11187208

(51) Int. Cl.
*G01J 5/00*    (2006.01)
*G01J 5/02*    (2006.01)
*G01J 5/22*    (2006.01)
(Continued)

(52) U.S. Cl.
CPC ............. *G01J 5/0022* (2013.01); *G01J 5/0025* (2013.01); *G01J 5/025* (2013.01); *G01J 5/026* (2013.01);
(Continued)

(58) Field of Classification Search
CPC .................................. G01J 5/0022; G01J 5/08
USPC ......................................................... 250/342
See application file for complete search history.

(56) References Cited

U.S. PATENT DOCUMENTS

| 4,318,089 A | 3/1982 | Frankel et al. |
| 4,849,737 A | 7/1989 | Kirihata et al. |

(Continued)

FOREIGN PATENT DOCUMENTS

| EP | 1169342 A3 | 9/2000 |
| WO | 98/47118 A1 | 10/1998 |

OTHER PUBLICATIONS

International Search Report (ISR) dated Dec. 13, 2012, for PCT/EP2012/071284.
(Continued)

*Primary Examiner* — David Porta
*Assistant Examiner* — Abra Fein
(74) *Attorney, Agent, or Firm* — Bacon & Thomas, PLLC

(57) ABSTRACT

The present invention relates to a detection device and a method for detecting a presence of an object in a surveillance area. The device comprises at least one infrared radiation sensing element each adapted for generating a sensor signal related to a quantity of infrared radiation received from within the surveillance area by the infrared radiation sensing element, a processing unit and an output means for outputting a determined presence of the object and/or a property derived therefrom. The processing unit is adapted for: obtaining the at least one sensor signal; generating at least one contrast value by comparing the at least one sensor signal to at least one reference value; determining the presence of the object by evaluating a condition on said at least one contrast value; and adjusting the at least one reference value such that negative feedback is applied to the at least one contrast value.

9 Claims, 4 Drawing Sheets

(51) Int. Cl.
*G01J 5/08* (2006.01)
*G08B 13/19* (2006.01)

(52) U.S. Cl.
CPC ................ *G01J 5/08* (2013.01); *G01J 5/0806* (2013.01); *G01J 5/0846* (2013.01); *G01J 5/22* (2013.01); *G08B 13/19* (2013.01)

(56) References Cited

U.S. PATENT DOCUMENTS

RE34,789 E    11/1994   Fraden
5,555,512 A    9/1996   Imai et al.
2007/0110181 A1  5/2007   Eskildsen

OTHER PUBLICATIONS

European Search Report dated Mar. 22, 2012, for European Priority Application EP 11187208.1.
1st Written Opinion dated Dec. 13, 2012, for PCT/EP2012/071284.
2nd Written Opinion dated Sep. 30, 2013, for PCT/EP2012/071284.
"Skin Temperature in Relation to the Warmth of the Environment", T. Bedford, The Journal of Hygiene, vol. 35, No. 3, pp. 307-317, Aug. 1935. (Cited in Specification).

Measurement:
20.0  20.0  20.5  29.0  25.0  20.0  20.0  20.0

INFRARED PRESENCE DETECTOR FOR DETECTING A PRESENCE OF AN OBJECT IN A SURVEILLANCE AREA

FIELD OF THE INVENTION

The present invention relates to the field of presence detection. More specifically it relates to the determination of the presence of objects in a region of interest by using a thermal radiation sensor.

BACKGROUND OF THE INVENTION

Presence or occupancy detection is used in systems that automatically take action when an object of interest, e.g. a person, is present in a region of interest, e.g. a surveillance area. For example, a door, e.g. a sliding door, may be automatically opened when people are standing in front of it, lights may be switched on when a person enters a room or is in the vicinity of the lights, lights may be switched off when no-one is in a room, or an alarm may be triggered when an intrusion is detected.

Several methods of presence detection are known in the art. For example, pressure sensitive sensors or inductive loops may be integrated in a floor in order to detect the presence of persons or vehicles. For heat generating objects, e.g. particularly for persons and/or animals such as pets, detection may involve sensors for detecting infrared radiation emitted by these objects. Infrared detection may be carried out using compact and affordable technology, and has the advantage over other techniques, such as visual image recognition, acoustic sensing or ultrasonic detection, that warm-blooded living beings, such as humans, emit thermal radiation having a characteristic spectral distribution, e.g. a peak around 9.5 µm for humans, and having considerable power, e.g. around 100 W for humans. Since infrared radiation is emitted by these warm-blooded living beings, detection does not require external lighting. Furthermore, many materials which are opaque or only allow limited transmission of light in the visual spectrum are transparent for infrared radiation.

As an example, in state of the art devices for presence or occupancy detection, passive infrared (PIR) sensors are commonly used to detect moving heat generating objects in a surveillance area. Such a PIR sensor transforms infrared energy, e.g. heat radiation, into an electrical signal, e.g. a voltage. The term passive in this instance means that the PIR sensor does not emit an infrared beam but merely passively accepts incoming infrared radiation. PIR sensors for detecting persons may have a wavelength sensitivity peak tuned to around 10 µm, e.g. close to the 9.5 µm, the peak wavelength of infrared radiation emitted by humans. Such a PIR sensor device for occupancy detection is disclosed in U.S. Pat. No. 4,318,089. In this document, a prior art PIR sensor device for presence detection may comprise a pair of spaced apart infrared radiation sensing elements in an enclosure, such as a three-pin metal header package for semiconductor devices, e.g. a TO-5 package. The enclosure may further feature a transparent window in order to limit the radiation transmitted through the window into the enclosure to a suitable wavelength range, e.g. between 5 µm and 15 µm or between 7 µm and 14 µm. Such a transparent window may for example be manufactured from an appropriate material such as germanium, silicon or polyethylene.

In a typical prior art PIR sensor device, the pair of infrared radiation sensing elements may be pyroelectric elements, connected in a voltage bucking configuration, for example connected in anti-phase series, e.g. by an electrically connected pair of matched poles of both elements. Pyroelectric elements have a differential response; a temperature change induces a temporary voltage change over the element which will dissipate due to leakage current at constant temperature. However, a differential readout arrangement over two elements may additionally cancel out signals caused by vibration, ambient temperature changes or field-wide illumination, e.g. by sunlight. The enclosure comprising the pyroelectric elements may further comprise a sensitive field-effect transistor (FET) in order to read out the voltage over the pair of sensitive elements. The two sensitive elements in anti-phase series may for example be grounded on one terminal, and on the other terminal be connected to the gate of the FET and connected to a pull-down resistor.

The prior art sensor devices further typically comprise a focusing element such as a Fresnel lens or a multi-faceted parabolic mirror, in order to project infrared radiation emitted by an object that generates heat, e.g. a person, onto the sensing elements. This focusing element is designed such that radiation emitted by a heat-generating object moving across the surveillance area, e.g. crossing the field of view of the detection device, is projected onto the sensing elements in an alternating manner, i.e. the element on which this radiation is concentrated switches repeatedly. Thus, an alternating current is generated on the output of the FET, which may be further amplified.

The advantage of coupling the elements in a voltage bucking configuration, e.g. in anti-phase series, is that the sensor device becomes insensitive to the environment temperature. However, as the sensing elements never exhibit quite the same characteristics, offsets may arise which have to be filtered out of the system by creating a floating reference level based on an averaging low-pass filter.

In a digital embodiment of this prior art device, further filtering may condition the signal, e.g. to reduce aliasing, before sampling it with an analog-to-digital converter (ADC), usually at a low sampling rate, for example less than 10 Hz, e.g. 5 Hz. The sampling rate is typically quite low due to a low signal-to-noise ratio (SNR), e.g. a SNR of about 2. In the digital domain, the peaks of the filtered signal may be detected, which will trigger an event for a preset duration if it reached a certain level, for example a peak may trigger the switching on of a light or the opening of a door and the restarting of a timer which will switch off the light or close the door after a preset delay, which is usually user-controllable.

Similar analog circuits are known in the art which implement the same or a similar function. In both analog and digital devices, the timer delay and the sensitivity of the device may be controlled by altering a setting.

However, such PIR-based detection method may have disadvantages caused by the inherent differentiating behavior of the design. Such devices only get triggered when moving objects are detected in the surveillance area. For example, when persons stay longer motionless than a timer in a PIR-based sensor device for light switching allows, they might be surprised by the switching off of the light.

In U.S. Pat. No. 4,849,737, another PIR-based detector is disclosed. This prior art sensor is adapted for mechanically scanning a space, e.g. by arranging the PIR-based detector on a rotating disc. Thus, a person which stays substantially motionless with respect to his surroundings can be observed by this prior art PIR-based detector because the motion of the sensor establishes a relative movement between the person and the detector. However, the detection efficiency of such PIR-based sensors may still depend on the relative speed of the detector and the person being detected.

Furthermore, PIR devices as known in the art often require a complex design, e.g. carefully designed Fresnel lenses, to be able to provide an indication of direction of movement of a detected object, e.g. direction of walking of a person. Automatic sliding doors that use PIR sensors to detect persons are therefore typically not arranged at the side-walls of hallways because of the many false alarms that may be triggered by people just passing by.

Furthermore, designing a PIR-based device that is capable of providing an indication of the number of detected objects in a surveillance area, e.g. how many persons are present in a scene, poses further complications. A rudimentary indication of the number of persons present, e.g. distinguishing between a single or multiple persons, would for example be useful in efficient person specific life-style monitoring devices, e.g. for monitoring applications in elderly care in situations where more elderly share the same living spaces.

SUMMARY OF THE INVENTION

It is an object of embodiments of the present invention to provide good presence detection for heat radiation emitting objects.

The above objective is accomplished by a method and device according to the present invention.

In a first aspect, the present invention provides a detection device for detecting a presence of an object in a surveillance area. The device comprises at least one infrared radiation sensing element adapted for generating a sensor signal related to a quantity of infrared radiation received from within the surveillance area; a processing unit adapted for obtaining said sensor signal, generating a contrast value by comparing the obtained sensor signal to a reference value, and determining the presence of the object by evaluating a condition on said contrast value; and an output means for outputting the determined presence of the object and/or a property derived therefrom. In embodiments of the present invention, the processing unit is further adapted for adjusting the reference value such that negative feedback is applied to the contrast value.

It is an advantage of embodiments of the present invention that a device is provided that may detect objects which emit radiant heat, both when these objects remain static and when these objects are moving.

It is an advantage of embodiments of the present invention that a device is provided that may not be sensitive to immobile heat-emitting objects, such as heaters, while remaining sensitive to mobile heat-emitting objects, even when such objects remain immobile for a while.

It is an advantage of embodiments of the present invention that a device is provided that may replace conventional PIR-based detector devices in a detection system without requiring extensive redesign.

It is an advantage of embodiments of the present invention that a device is provided that does not require a Fresnel lens.

It is an advantage of embodiments of the present invention that a device is provided that does not require a timer.

It is an advantage of embodiments of the present invention that a device is provided that may be used in a wide range of settings without requiring adjustments of user-controllable parameters, such as sensitivity or timer settings.

It is an advantage of embodiments of the present invention that a device is provided that may be compact and requires only few components.

In embodiments of the present invention, the processing unit may be adapted for generating a contrast value by subtracting a reference value from the sensor signal; determining the object as being present when said contrast value exceeds a predetermined first level; and adjusting the reference value such that negative feedback is applied to the contrast value by adding a predetermined fraction of the contrast value thereto when said contrast value is below a predetermined second level.

It is an advantage of embodiments of the present invention that a device is provided that is robust to nuisance objects, such as heaters or windows, while remaining sensitive to targeted heat-emitting objects such as people.

It is an advantage of embodiments of the present invention that a device is provided that may adapt to the presence of such nuisance objects in a dynamic and efficient manner, e.g. without requiring a calibration without targeted heat-emitting objects such as people present.

In a detection device according to embodiments of the present invention, the at least one infrared radiation sensing element may comprise at least one thermopile sensor.

It is an advantage of embodiments of the present invention that a device is provided that may detect both immobile and mobile objects which emit radiant heat.

A detection device according to embodiments of the present invention may further comprise an ambient temperature sensor. In a detection device according to embodiments of the present invention the processing unit may be further adapted for receiving a temperature signal from said ambient temperature sensor and for applying a temperature correction to said sensor signal or to said reference value taking into account the temperature signal.

It is an advantage of a detection device according to embodiments of the present invention that it may be controlled by few parameters which are little sensitive to environmental conditions, e.g. that may not require tuning for use in a specific surveillance area.

In a detection device according to embodiments of the present invention, the at least one infrared radiation sensing element may comprise an array of infrared radiation sensing elements, and the processing unit may be adapted for receiving a plurality of sensor signals, each sensor signal being received from a corresponding infrared radiation sensing element of said array; providing a plurality of contrast values by element-by-element comparing the plurality of sensor signals to a plurality of reference values; determining the presence of the object by evaluating said condition on said plurality of contrast values; and adjusting the plurality of reference values element-by-element such that negative feedback is applied to the plurality of contrast values. It is an advantage of such embodiments of the present invention that a device may be provided that can identify the position of an object to be detected in a surveillance area.

It is an advantage of embodiments of the present invention that a device is provided that may determine the direction of movement of one or multiple objects in a surveillance area, e.g. in order to improve efficiency when used in a control system for the opening of sliding doors.

In a detection device according to embodiments of the present invention, each infrared radiation sensing element of said array may be adapted for generating a sensor signal related to a quantity of infrared radiation received from within a corresponding sub-region of the surveillance area, and said output means may be adapted for outputting a count of contrast values in the plurality of contrast values which satisfy said condition and/or a property derived therefrom. It is an advantage of such embodiments of the present invention that a device may be provided that can perform counting, e.g. of persons in a room.

A detection device according to embodiments of the present invention may furthermore comprise at least one wireless communication module for transmitting information between said at least one infrared radiation sensing element, said processing unit, and/or said output means. It is an advantage of embodiments of the present invention that a device may be provided that may be easy to install, i.e. that requires few wired connections.

In a second aspect, the present invention provides a method for detecting a presence of an object in a surveillance area. The method comprises obtaining at least one sensor signal value related to a quantity of infrared radiation received from within the surveillance area; generating at least one contrast value by comparing the at least one sensor signal value to at least one reference value; and determining the presence of the object by evaluating a condition on said at least one contrast value. The method according to embodiments of the present invention furthermore comprises adjusting the at least one reference value such that negative feedback is applied to said at least one contrast value.

In a method according to embodiments of the present invention, said providing a contrast value may comprise subtracting the reference value from the sensor signal value, and determining the presence of the object may comprise evaluating whether said contrast value exceeds a predetermined first level. Said adjusting of the reference value may comprise adding a predetermined fraction of the contrast value thereto. Said adjusting of the reference value may be executed when a further condition on said contrast value is met.

In a method according to embodiments of the present invention, evaluating whether a further condition on said contrast value is met may comprise evaluating whether said contrast value is below a predetermined second level.

A method according to embodiments of the present invention may furthermore comprise applying a temperature correction to said sensor signal value or to said reference value taking into account an ambient temperature measurement.

In a method according to embodiments of the present invention, obtaining a sensor signal value may comprise obtaining a plurality of sensor signal values, each sensor signal value being related to a quantity of infrared radiation received from within a corresponding sub-region of the surveillance area; generating a contrast value may comprise providing a plurality of contrast values by element-by-element comparison of the plurality of sensor signals to a plurality of reference values; determining the presence of the object may comprise evaluating said condition on said plurality of contrast values; and adjusting the reference value may comprise adjusting the plurality of reference values element-by-element such that negative feedback is applied to each of the plurality of contrast values.

These and other aspects of the invention will be apparent from and elucidated with reference to the embodiment(s) described hereinafter.

Figure 1:
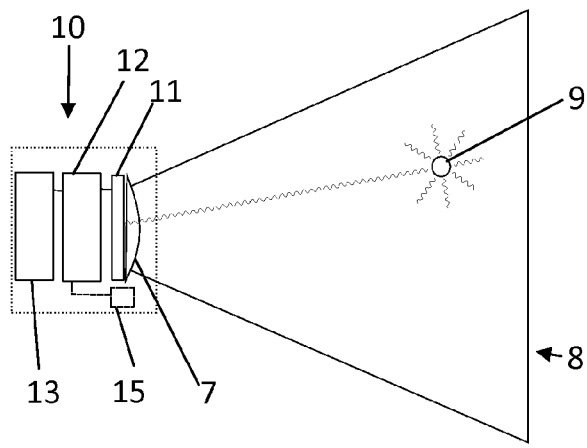
FIG. 1 schematically shows a first embodiment of a detection device according to a first aspect of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a "thermopile", reference is made to an electronic element for converting thermal energy into electrical energy, e.g. for generating a voltage difference indicative of a local temperature difference, e.g. substantially proportional to such temperature difference. Such a thermopile comprises a plurality of interconnected thermocouples, usually connected in series, which may for example each be obtained by stacking a number of layers of at least two different conductive materials such as metal alloys. In a thermocouple, if a temperature difference is applied to two junctions of two dissimilar conductors, a voltage which may be proportional to the temperature difference is generated by the Seebeck-effect. By combining multiple thermocouples in a series connection, a thermopile is obtained that amplifies the rather small voltage drop generated over a single thermocouple. A thermopile for infrared radiation detection may be formed on a semiconductor, e.g. silicon, chip. For example, an area of this chip may be etched away, leaving only a thin membrane, on which alternating layers of two different conductive materials may be deposited. Both types of conductors may have alternating junctions in the centre of the membrane and on the bulk of the semiconductor substrate. The central junctions, or hot junctions, at the centre of the membrane may then be covered by a suitable infrared absorbing layer. The junctions at the other extremities of the conductors form the cold junctions. The thermopile may be mounted on a TO or SMD header with a suitable filter cap, i.e. transparent for an infrared wavelength window of interest.

Where in embodiments of the present invention reference is made to applying negative feedback to an output of a system, reference is made to an adjustment of a variable which influences this output, such that the output of the system remains substantially constant.

In a first aspect, the present invention relates to a detection device 10 for detecting presence or absence of an object 9 in a surveillance area 8. FIG. 1 shows an illustrative embodiment of a detection device 10 according to this first aspect. This detection device 10 comprises at least one infrared radiation sensing element 11, in the form of a thermopile sensor. This infrared radiation sensing element 11 is adapted for generating a sensor signal, i.e. an electrical output signal such as for example an output voltage, indicative of infrared radiation received from within the surveillance area 8. The detection device 10 may comprise a focusing element 7, e.g. a lens, for example a silicon lens, for focusing onto the sensing element 11 infrared radiation from within the surveillance area 8, e.g. from within a cone which projects onto the infrared radiation sensing element 11 through the focusing element 7.

The detection device 10 further comprises a processing unit 12, which is adapted for receiving the sensor signal from the sensing element 11. The sensor signal may be transferred over a signal wire as an analog electric signal from the infrared radiation sensing element 11 to the processing unit 12. In such case, the processing unit 12 may comprise an analog-to-digital (ADC) converter and a microprocessor or a digital computing device for carrying out the logical and arithmetic operations set forth further herein. However, it will be understood by the person skilled in the art that the processing unit 12 may be adapted for analog signal processing, and as such in fact may carry out the described operations without an analog-to-digital conversion. Alternatively, the sensor signal may be transferred from the sensing element 11 to the processing unit 12 in a digital form, e.g. the signal may be converted into a digital signal by the sensing device and then transmitted, for example, over a bus such as an $I^2C$ bus. Such digitized signal may also be transmitted through wireless communication modules.

The processing unit 12 is furthermore adapted for providing a contrast value by comparing the received sensor signal to a reference value. This contrast value may be a difference calculated by subtracting the reference value from the sensor signal, or may include a function, e.g. a cubic function, applied to this difference. For example, the sensor signal may be represented by a digital sample, e.g. sampled by an ADC component at a sampling rate of, for example, less than 20 Hz, e.g. less than 10 Hz, such as at a sampling rate of 5 Hz or below, or a sampling rate of 1 Hz of below, even down to 0.01 Hz for example for sensors that are in "sleep mode" and check every minute or so whether a living being is present, in order for it to decide to go into "awake mode" or not. For each sample $I_i$ of the sensor signal, where i is an index number in the time series of values obtained by sampling, a contrast value $C_i$ is calculated, e.g. $C_i = I_i - B_{i-1}$, where $B_{i-1}$ refers to the reference value provided in a previous time step i−1, or to a pre-set default value $B_0$ for the calculation of the first contrast value in the series, i=1. The pre-set default value $B_0$ may correspond to a sensor signal value which would be obtained for a sufficiently high temperature of the surveillance area 8, e.g. substantially higher than room temperature, for example 40° C.

Figure 6:
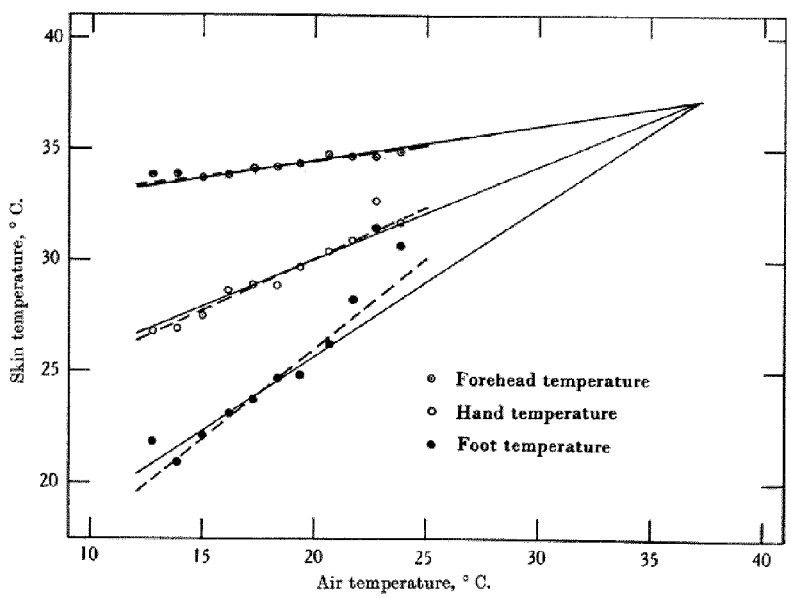
FIG. 6 illustrates skin temperature in relation to the warmth of the environment.

The processing unit 12 is furthermore adapted for determining the presence or absence of the object 9 by evaluating a condition on the contrast value. This object 9 may for example be determined to be present when the contrast value exceeds a predetermined first level. A heat-emitting object 9 may be assumed to have a surface temperature higher than its environment, e.g. a person may have a surface temperature approximately between 27° C. and 33° C., for a room with ambient temperature between 15° C. and 30° C. The reference value $B_{i-1}$ may be interpreted as an evolving background temperature correction, e.g. will be adjusted in the way discussed further below in order to follow changes in the observed sensor signal $I_i$ due to temperature changes of the environment and of nuisance objects in the field of view of the sensing element 11, i.e. which are not to be detected as an object 9 of interest, for example a heating radiator. For detection of presence of a living being, e.g. for detection of a human presence, in an area at room temperature, the presence may be determined by checking whether the contrast value $C_i$ exceeds a predetermined first level Li (which optionally can be a function of the room temperature), for example a value corresponding to a difference in sensor signal value obtained for an observed temperature difference between 0.5° C. and 10° C., e.g. 2° C. This condition on the contrast value reflects an underlying assumption about the object 9 to be detected, e.g. a human presence is typically hotter than the room-temperature as seen in FIG. 6, taken from "Skin Temperature in Relation to the Warmth of the Environment", T. Bedford, The Journal of Hygiene, Vol. 35, No. 3, pp. 307-317, August 1935.

It should be noted that this is a feature of the object to be detected and its environment, and may therefore be more robust than, for example, a timer and/or sensitivity setting of a state of the art PIR sensor.

The detection device 10 according to embodiments of the present invention comprises an output means 13 for outputting the determined presence of the object 9 and/or a property derived therefrom. The output means 13 may comprise a signal wire output, a digital bus interface, a wired or wireless network interface or other means of electronic communication. The output means 13 may also comprise a power output for driving a device connected thereto, for example an actuator, such as an actuator for opening and closing a door, an alarm or a light. The device 10 may communicate through the output means 13 a derived property, i.e. a signal different from the present status of object presence, but related thereto. Such a derived property may for example be a statistic, e.g. number of objects detected in a time window, or the elapsed time since a last detection.

The processing unit 12 is furthermore adapted for adjusting the reference value such that negative feedback is applied to the contrast value. For example, negative feedback may be provided by adding a predetermined fraction of the contrast value to the reference value. Furthermore, in advantageous embodiments this negative feedback may be conditional, such that the negative feedback is only applied when the contrast value is below a predetermined second level. This negative feedback regime may adjust the contrast value $C_i$ over time in order to compensate for changes, e.g. a radiator in the field of view that is slowly heating up.

For example, a new reference value $B_i$ may be provided by $B_i = B_{i-1} + \beta \cdot C_i$. The proportionality ratio $\beta$ may reflect a learning rate, e.g. in a convex filter approach, and may, for example, have a value between 0.01 and 0.10, e.g. 0.05, for a sampling rate of 1 Hz. This adjustment may be carried out conditionally, e.g.

$$B_i = \begin{cases} B_{i-1} + \beta \cdot C_i, & \text{if } C_i < \theta \\ B_{i-1}, & \text{if } C_i \geq \theta, \end{cases}$$

in which the predetermined second level $\theta$ may have a value smaller than the predetermined first level, e.g. a value corresponding to a sensor signal value which would be obtained for a temperature difference of between 0.1 and 2° C./s, e.g. below 1° C./s, for example 0.2° C./s.

Optionally, the detection device 10 may comprise an ambient temperature sensor 15. The processing unit 12 may be adapted for receiving a temperature signal from this ambient temperature sensor 15 and for applying a temperature correction to the sensor signal $I_i$ or to the pre-determined reference value $B_i$ taking into account the temperature signal. For example, the sensor signal $I_i$, the contrast value $C_i$ and the reference value $B_i$ may all be normalized to a temperature scale, e.g. in ° C., using the ambient temperature sensor reading $T_i$. In summary, the processing unit 12 may perform following operations repeatedly:

1. obtain samples $I_i$ and $T_i$,
2. calculate $C_i = I_i - B_{i-1}$,
3. calculate $$B_i = \begin{cases} (1-\beta)\frac{T_i}{T_{i-1}} B_{i-1} + \beta \cdot I_i, & \text{if } C_i < \theta \\ \frac{T_i}{T_{i-1}} B_{i-1}, & \text{if } C_i \geq \theta; \end{cases}$$

4. determine the presence of the object 9 when $C_i >$ a predetermined margin L.

It should be noted that the contrast value in this example is calculated by a signed function, in order to generate a presence signal for objects which are hotter by a predetermined margin L than a background level. The second threshold $\theta$, which may typically be smaller than L, adjusts a background reference level when a signal colder than the background is observed, or a signal which is hotter, but does not exceed the second threshold $\theta$. The ambient temperature measurements may be used to further calibrate the background signal through time in varying circumstances, thus providing normalized contrast values. This may increase robustness, i.e. the condition for presence determination and the condition for conditional negative feedback correction may be defined in units which are less sensitive to environmental conditions.

Figure 2:
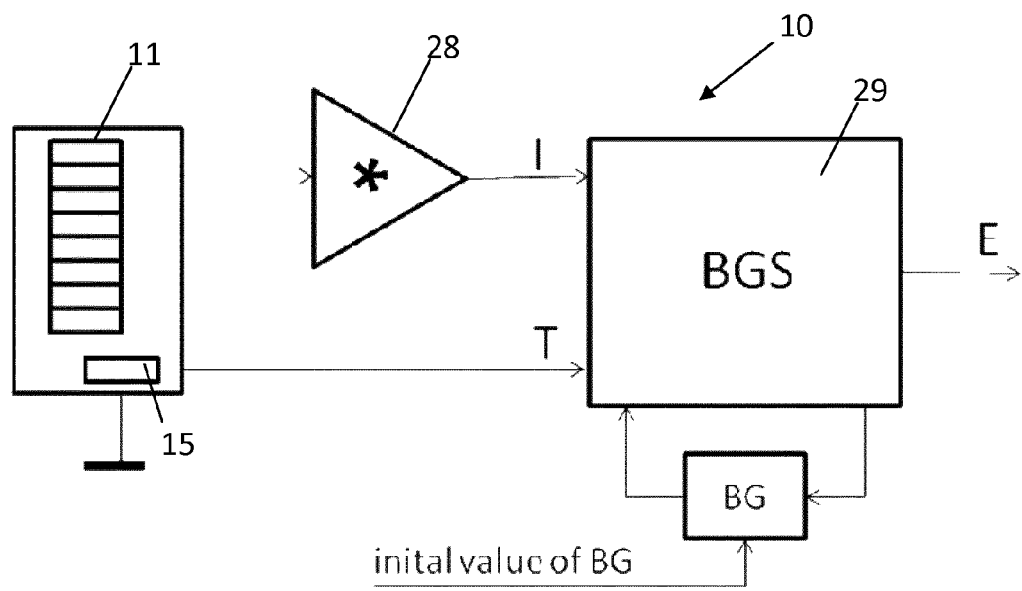
FIG. 2 schematically illustrates an architecture of a thermopile sensor system according to embodiments of the present invention.

FIG. 2 schematically illustrates the architecture of a thermopile sensor system 10 according to embodiments of the present invention, comprising at least one IR radiation sensing element 11, e.g. a thermopile array. The signals of the radiation sensing element 11 are amplified in an amplifier 28 and sent as sensor signals I to a background subtraction unit 29 together with temperature information T from the room temperature. The background subtraction unit 29 updates the background signal BG and reports an event E when the sensor system 10 detects presence of a living being. In accordance with embodiments of the present invention, the background subtraction unit 29 implements a background/trend subtraction function, taking into account the knowledge that has been obtained about both the detected object 9 and the environment:

living beings, in particular people, are warmer than the environment temperature (if the objects to be detected are colder than the environment temperature, functions are turned over); and "false objects", such as for example heaters and windows, only increase their temperature slowly in time, with a low gradient in the upward direction.

Figure 3:
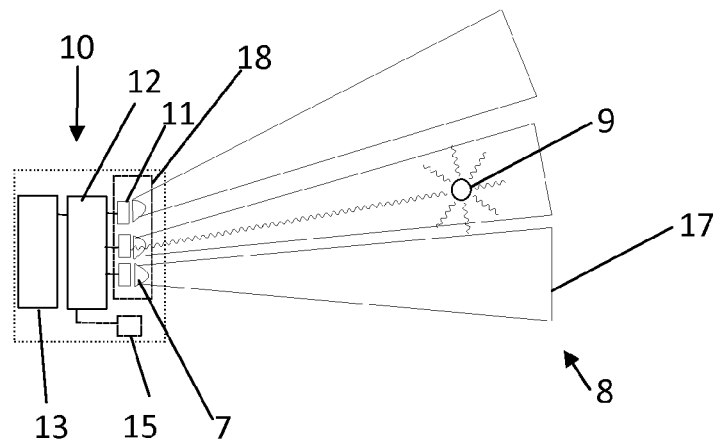
FIG. 3 schematically shows a second embodiment of a detection device according to the first aspect of the present invention.

In a second embodiment, illustrated in FIG. 3, the at least one infrared radiation sensing element 11 may comprise at least two infrared radiation sensing elements 11. For example, the at least one infrared radiation sensing element 11 may comprise an array 18 of infrared radiation sensing elements, e.g. infrared radiation sensing elements in a regularly interspaced array, for example a one-dimensional array, e.g. an array of 8×1 elements, or a two-dimensional array, e.g. an array of 8×8 elements. Each infrared radiation sensing element 11 of the array 18 may be adapted for generating a sensor signal related to a quantity of infrared radiation received from within a corresponding sub-region 17 of the surveillance area 8. Thus the surveillance area 8 may be covered by a plurality of sub-regions 17, e.g. cones, from which infrared light is projected onto the respective sensing elements 11.

For example, the array 18 may be a thermopile sensor array, such as a thermopile sensor array on an integrated circuit. Such a thermopile sensor array may comprise a set of remote temperature sensing elements, covering a joint viewing angle. Next to the temperature sensing elements, they may also have an accurate on-board means for temperature measurement of the sensor itself, e.g. a thermistor.

Thermopile arrays may detect living beings, e.g. people, not only in motion, but also when they are static. Also, such arrays may be used to determine in which direction living beings are moving.

Besides the plurality of infrared radiation sensing elements 11, a sensor system 10 according to the second embodiment of the present invention also comprises a processing unit 12. The processing unit 12 may be adapted for receiving a plurality of sensor signals, each sensor signal being received from a corresponding infrared radiation sensing element 11 of the array 18. With each sensor signal, a contrast value and a reference value may be associated, i.e. the processing unit 12 may be adapted for providing a plurality of contrast values by element-by-element comparing the plurality of sensor signals to a plurality of reference values: $\vec{C}_i = \vec{T}_i - \vec{B}_{i-1}$.

The processing unit 12 may further be adapted for determining the presence of the object 9 by evaluating the condition on the plurality of contrast values:

$$E_j = \begin{cases} 1 & \text{if } C_{i,j} > Li \\ 0 & \text{otherwise,} \end{cases}$$

in which j indexes the vector components associated with the plurality of sensing elements. Li can be a function of the room temperature measurement.

Figure 4:
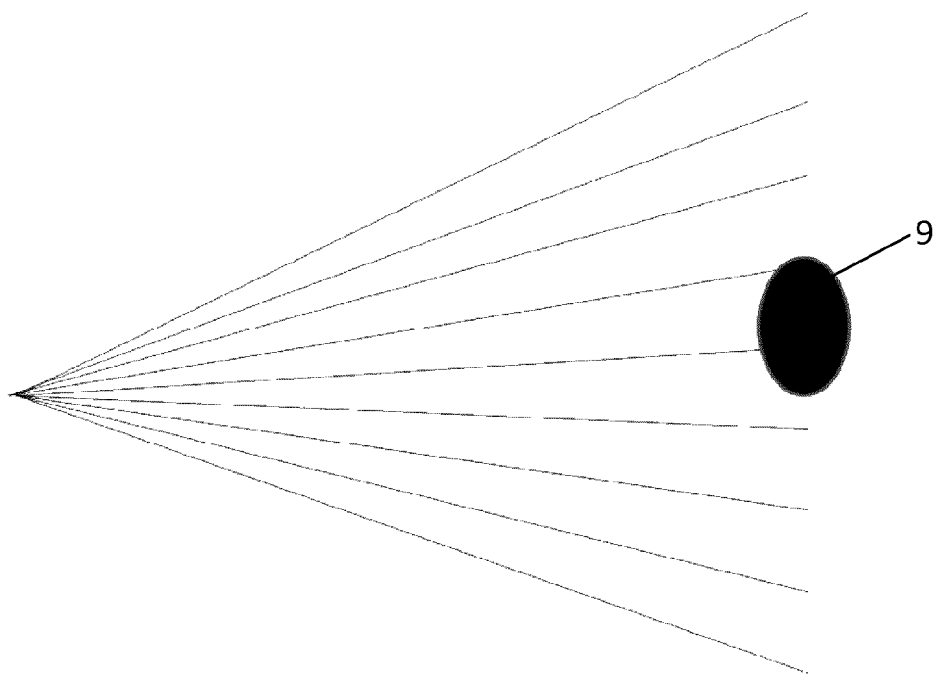
FIG. 4 illustrates detection of an object by means of a detection device according to the second embodiment of the first aspect of the present invention.

The I, BG and E signals as introduced with reference to FIG. 2 in this embodiment are implemented as vectors, with the elements connected to the elements of the thermopile array sensor 11. In this way the presence of a living being can be deducted relative to the angle of the sensor, as shown in FIG. 4. The samples I and T are sampled in a repetitive way, for example once per second.

The output means 13 may then communicate a presence, e.g.

$$\prod_j E_j$$

to a connected device or a user. The output means may also provide a related property, such as a count of persons present in a room, for example by counting the number of peaks in $\vec{C}_i$. The output means 13 may for example provide an indication of the direction in which objects are moving, for example by comparing a stored value $E_{j-1}$ or $C_{j-1}$ to the current value $E_j$ or $C_j$.

The processing unit 12 may further be adapted for adjusting the plurality of reference values element-by-element such that negative feedback is applied to the plurality of contrast values. For example, $$B_{i,j} = \begin{cases} (1-\beta)\frac{T_i}{T_{i-1}} B_{i-1,j} + \beta \cdot I_{i,j}, & \text{if } C_{i,j} < \theta \\ \frac{T_i}{T_{i-1}} B_{i-1,j}, & \text{if } C_{i,j} \geq \theta. \end{cases}$$

Based on such detection of movement determined on the basis of signals obtained from the plurality of sensing elements 11, an actuator may be driven, such as an actuator for opening or closing a door, or actuating an alarm or a light. This may for example be used in hospitals or elderly care, where, if one or more dedicated sensing elements (e.g. the middle sensor element in FIG. 3) deliver a presence signal, this means a patient is in a particular position, e.g. in bed or in the sofa, while if other sensing elements (e.g. the sensor elements left or right from the middle sensor element in FIG. 3) deliver a presence signal, this means the patient may have fallen or is walking around. Such detection by the "other" sensing elements (left or right from the middle sensor element in FIG. 3) might trigger an alarm.

Figure 5:
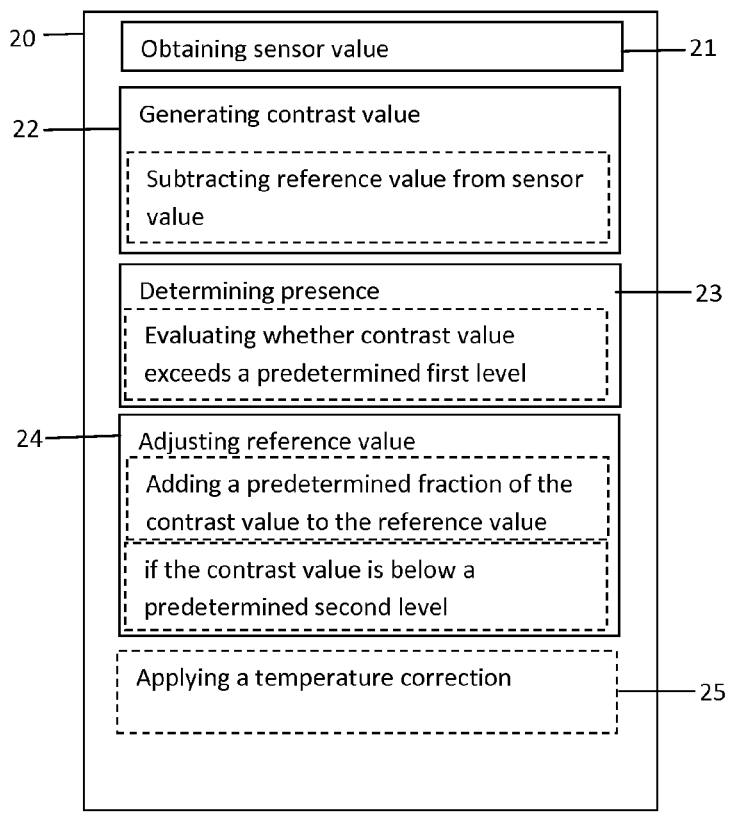
FIG. 5 illustrates exemplary method steps of a method according to a second aspect of the present invention.

In a second aspect, the present invention provides in a method 20 for detecting a presence of an object 9 in a surveillance area 8. Such an exemplary method 20 is illustrated in FIG. 5. Particularly, a method 20 according to the second aspect of the present invention may be carried out by a device according the first aspect of the present invention described hereinabove. The method 20 may be implemented in software, e.g. for executing on a microprocessor, such as a microprocessor forming part of the processing unit 12. Alternatively, the method 20 may be implemented through hardware design, or may be implemented as a combination of hard- and software.

This method 20 comprises obtaining 21 a sensor signal value related to a quantity of infrared radiation received from within the surveillance area 8, for example a sensor signal value represented by at least one sensor signal generated by at least one infrared radiation sensing element 11. The method 20 further comprises generating 22 at least one contrast value by comparing the obtained at least one sensor signal values to at least one reference value. This may comprise subtracting the at least one reference value from the at least one sensor signal value.

The method 20 further comprises determining 23 the presence of the object 9 by evaluating a condition on said generated at least one contrast value. This determining 23 may comprise evaluating whether the generated at least one contrast value exceeds a predetermined first level.

The method 20 furthermore comprises adjusting 24 the reference value such that negative feedback is applied to said contrast value. This adjusting 24 may comprise adding a predetermined fraction of the generated at least one contrast value thereto. Moreover, this adjusting 24 may be executed when a further condition on the contrast value is met, for example when the contrast value is below a predetermined second level.

Additionally, the method 20 may comprise applying 25 a temperature correction to the at least one sensor signal value or to the reference value, taking into account an ambient temperature measurement.

Obtaining 21 at least one sensor signal value in particular embodiments may comprise obtaining a plurality of sensor signal values, each sensor signal value being related to a quantity of infrared radiation received from within a corresponding sub-region 17 of the surveillance area 8. Providing a contrast value 22 may comprises providing a plurality of contrast values by element-by-element comparing the plurality of sensor signal values to a plurality of reference values. Determining 23 the presence of the object 9 may comprise evaluating the condition on the plurality of contrast values. Adjusting 24 the reference value may comprise adjusting the plurality of reference values element-by-element such that negative feedback is applied to each of the plurality of contrast values.

Embodiments of the present invention may provide accurate and efficient means and methods for the detection of living beings such as humans in a typical room-temperature environment. The present invention not being limited in any way thereby, principles of detection of heat-generating objects, such as human subjects, according to embodiments of the present invention may be explained by the following considerations. A background subtraction, i.e. a trend removal, may be performed in accordance with embodiments of the present invention on sensor data by taking into account specific knowledge of the object to be detected and the environment.

Firstly, it may be assumed that living beings such as people are warmer than their environment temperature. It will be obvious to the skilled person that objects which are consistently colder than their environment may be detected by embodiments of the present invention by adopting appropriate conditions for detection and/or conditional negative feedback. Secondly, it may be assumed that nuisance objects, such as heaters and windows, only increase their temperature slowly in time with a low gradient in the upward direction. Thirdly, objects which are colder than the current background reference level are preferred, i.e. may be adopted quickly to. If the temperature difference is larger than the threshold, updating the background is restricted by a limit on the increase in temperature per second. If the temperature is lower than the threshold, the background is updated unconditionally with the convex filter, so lower temperatures are quickly adapted to without restrictions.

These notions are different from image processing where the appearance of persons cannot be typically be indicated as higher or lower than the appearance of the environment, in color saturation, hue or intensity sense.

An example is presented hereinbelow to demonstrate principles of detection according to embodiments of the present invention, the present invention not being limited thereby in any way.

Figure 7:
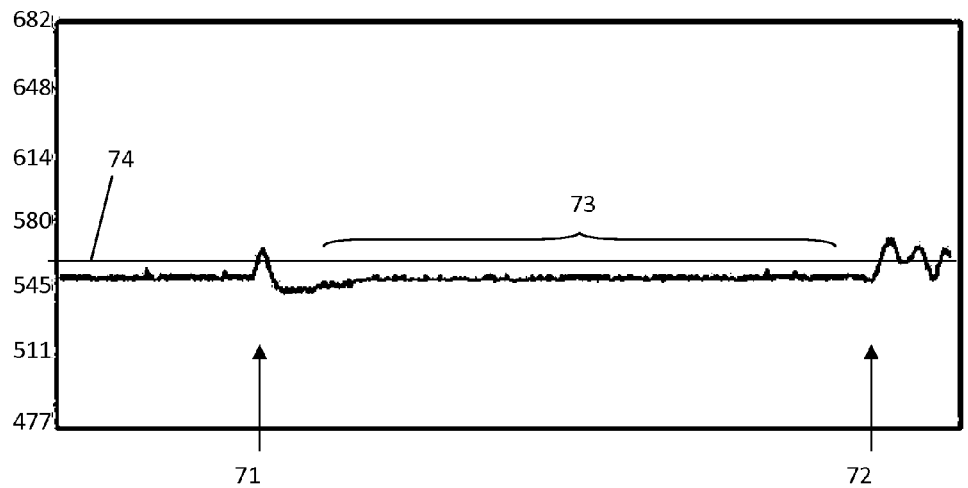
FIG. 7 shows an exemplary response signal as function of time for a prior art detection device.

In FIG. 7, a response curve is shown which was obtained from a PIR sensor with Fresnel lens as known in the art. The response curve shows the PIR response voltage as function of time. For this example, the conventional PIR sensor was directed towards a space with a chair. A person entered the space at a first time instance 71, sat on the chair over an extended time interval 73, and left again at a second time instance 72. As can be seen from FIG. 7, the PIR sensor reacts in a differential manner, showing heavy fluctuations on its output when it detects a moving person, e.g. near the first 71 and second 72 time instance, but not when the person is sitting down quietly, e.g. over the time interval 73. An exemplary threshold level 74 is indicated on FIG. 7, which would be suitable for indicating the presence of the moving person. However, detecting the static person is not possible using a similar threshold level due to the differential nature of the PIR sensor.

Figure 8:
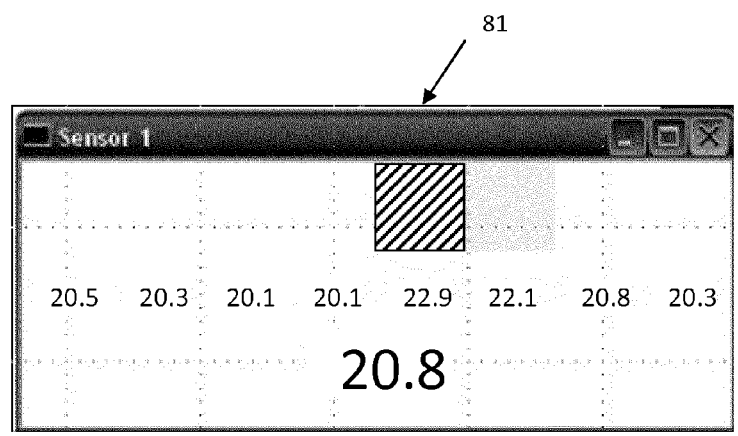
FIG. 8 shows an exemplary response signal for a detection device according to embodiments of the present invention when one object of interest is present.
Figure 9:
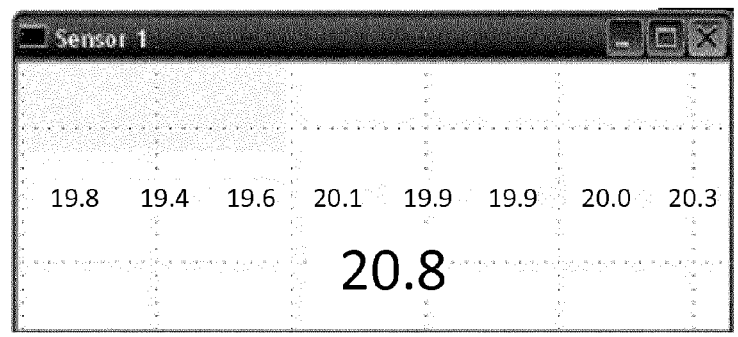
FIG. 9 shows an exemplary response signal for a detection device according to embodiments of the present invention when no object of interest is present.

On the other hand, a detection device according to embodiments of the present invention, comprising eight thermopile sensor elements, can detect the static person as shown in FIG. 8, in which the output value per sensor element is shown graphically and numerically. FIG. 8 shows the response obtained by the detection device according to embodiments of the present invention at a moment during the time interval 73 as shown in FIG. 7. The high intensity response of one pixel 81 corresponds with the person sitting down. For comparison, FIG. 9 shows the response obtained by the same device at a moment prior to the first time instance 71, thus before the person entered the room. Here, the absence of the person corresponds to the absence of elevated pixel values. Obviously, when a suitable sample rate is chosen, this detection device according to embodiments of the present invention can just as well detect moving persons in the space.

The invention claimed is:

1. A detection device for detecting a presence of an object in a surveillance area, the device comprising:
at least one infrared radiation sensing element adapted for generating a sensor signal related to a quantity of infrared radiation received from within the surveillance area,
a processing unit adapted for: obtaining said sensor signal; generating a contrast value by comparing the obtained sensor signal to a reference value; and determining the presence of the object by evaluating a condition on said contrast value; the processing unit being further adapted for adjusting the reference value such that a negative feedback is applied to the contrast value, and
an output means for outputting the determined presence of the object and/or a property derived therefrom,
wherein the at least one infrared radiation sensing element comprises at least one thermopile sensor, and in which said processing unit is adapted for:
generating the contrast value by subtracting the reference value from the sensor signal;
determining the presence of the object when said contrast value exceeds a predetermined first level; and
adjusting the reference value such that the negative feedback is applied to the contrast value by adding a predetermined fraction of the contrast value thereto when said contrast value is below a predetermined second level.

2. The detection device according to claim 1, the device further comprising an ambient temperature sensor.

3. The detection device according to claim 2, wherein the processing unit is further adapted for receiving a temperature signal from said ambient temperature sensor and for applying a temperature correction to said sensor signal or to said reference value taking into account the temperature signal.

4. The detection device according to claim 3, wherein the at least one infrared radiation sensing element comprises an array of infrared radiation sensing elements, and the processing unit is adapted for: receiving a plurality of sensor signals, each sensor signal being received from a corresponding infrared radiation sensing element of said array; providing a plurality of contrast values by element-by-element comparing the plurality of sensor signals to a plurality of reference values; determining the presence of the object by evaluating said condition on said plurality of contrast values; and adjusting the plurality of reference values element-by-element such that negative feedback is applied to the plurality of contrast values.

5. The detection device according to claim 4, wherein each infrared radiation sensing element of said array is adapted for generating a sensor signal related to a quantity of infrared radiation received from within a corresponding sub-region of the surveillance area, and said output means is adapted for outputting a count of contrast values in the plurality of contrast values which satisfy said condition and/or a property derived therefrom.

6. The detection device according to claim 5, furthermore comprising at least one wireless communication module for transmitting information between said at least one infrared radiation sensing element, said processing unit, and/or said output means.

7. A method for detecting a presence of an object in a surveillance area, the method comprising:

obtaining at least one sensor signal value related to a quantity of infrared radiation received from within the surveillance area, generating at least one contrast value by comparing the at least one sensor signal value to at least one reference value;

determining the presence of the object by evaluating a condition on said at least one contrast value, and adjusting the at least one reference value such that a negative feedback is applied to said at least one contrast value, wherein:

obtaining the at least one sensor signal value related to a quantity of infrared radiation received from within the surveillance area comprises having the at least one sensor signal value generated by at least one infrared radiation sensing element comprising at least one thermopile sensor, generating the at least one contrast value comprises subtracting the reference value from the sensor signal value, determining the presence of the object comprises evaluating whether said contrast value exceeds a predetermined first level, and adjusting of the reference value comprising adding a predetermined fraction of the contrast value thereto, said adjusting of the reference value being executed when a further condition on said contrast value is met, and evaluating whether said further condition on said contrast value is met comprising evaluating whether said contrast value is below a predetermined second level.

8. The method according to claim 7, furthermore comprising applying a temperature correction to said sensor signal value or to said reference value taking into account an ambient temperature measurement.

9. The method according to claim 8, wherein obtaining a sensor signal value comprises obtaining a plurality of sensor signal values, each sensor signal value being related to a quantity of infrared radiation received from within a corresponding sub-region of the surveillance area; generating a contrast value comprises providing a plurality of contrast values by element-by-element comparison of the plurality of sensor signals to a plurality of reference values; determining the presence of the object comprises evaluating said condition on said plurality of contrast values; and adjusting the reference value comprises adjusting the plurality of reference values element-by-element such that negative feedback is applied to each of the plurality of contrast values.

\* \* \* \* \*